Figure 1:
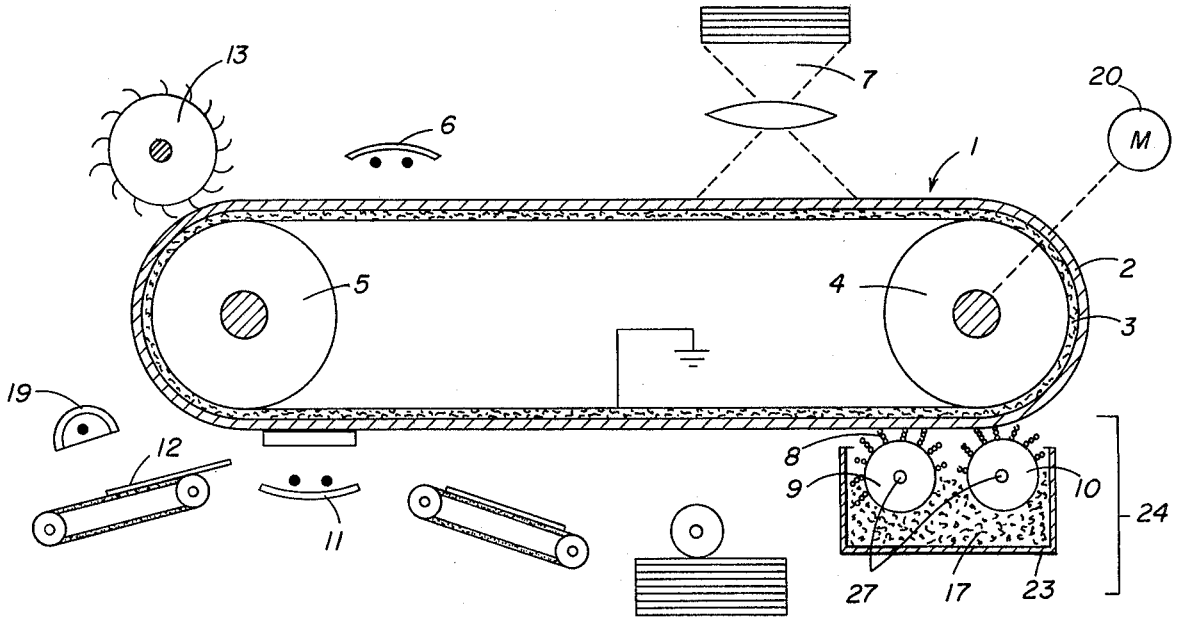
Figure 2:
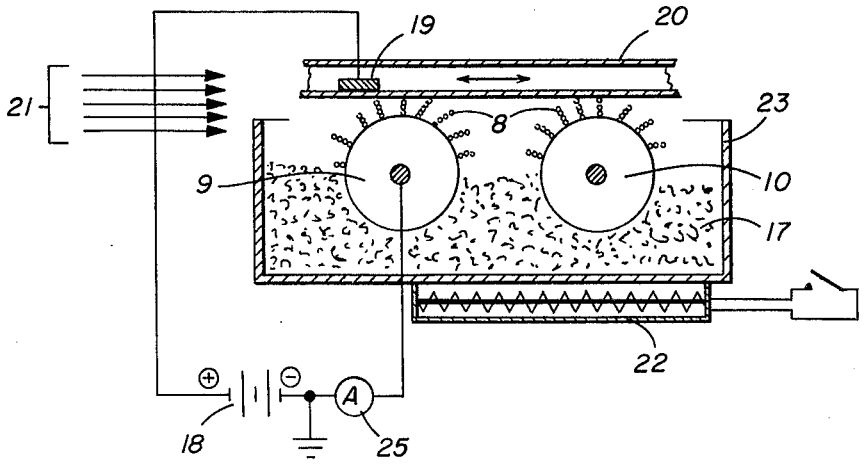
Figure 3:
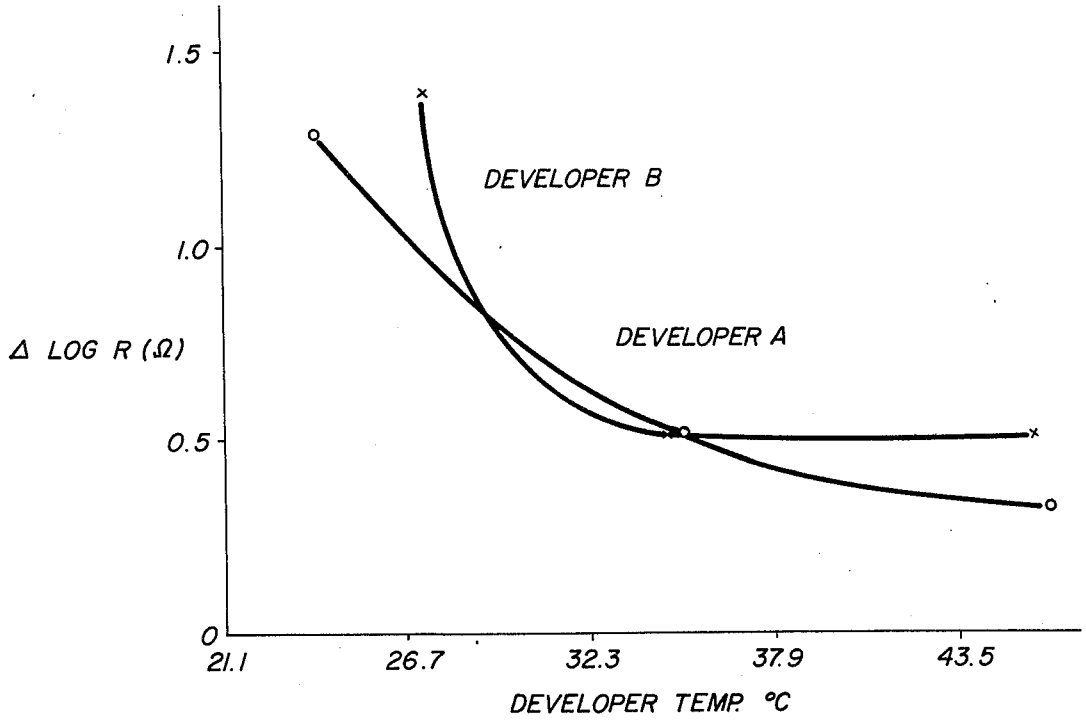
Figure 4:
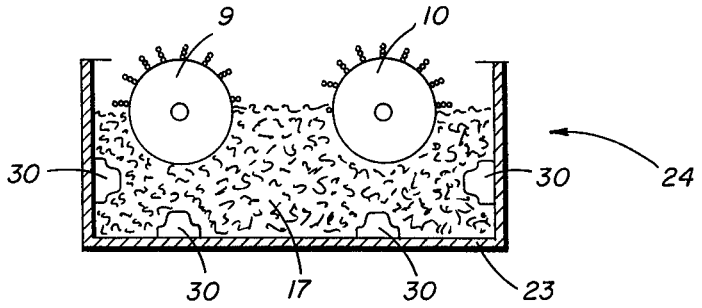
Figure 5:
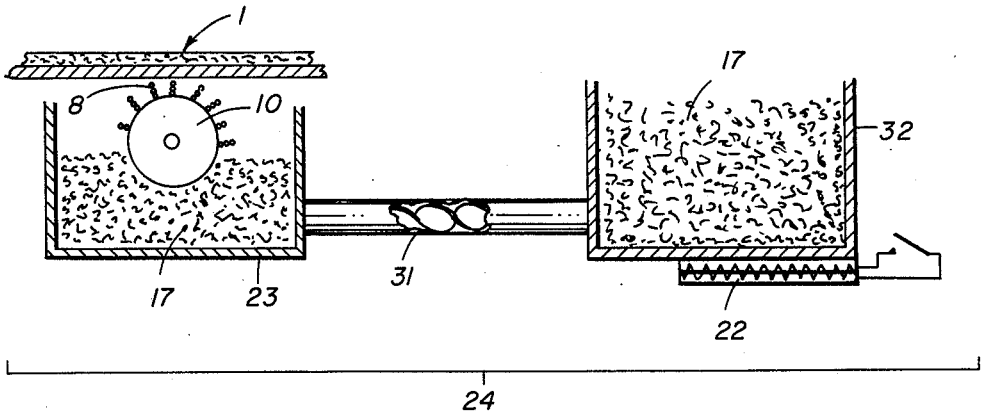

United States Defensive Publication [19] (H) [11] T956,001

Kasper et al. [43] Mar. 1, 1977

[54] ELECTROGRAPHIC APPARATUS AND PROCESS FOR HUMIDITY STABILIZED DEVELOPMENT

[76] Inventors: George P. Kasper; Robert J. O'Brien, both of c/o Kodak Park Division, Rochester, N.Y. 14650

[21] Appl. No.: 706,328

[22] Filed: July 19, 1976

Related U.S. Application Data

[63] Continuation of Ser. No. 571,674, April 25, 1975.

[51] Int. Cl.[2] ..... G03G 13/08

[52] U.S. Cl. ..... 96/1 SD

[57] ABSTRACT

An electrographic apparatus for applying a dry particulate developer mix comprising a triboelectric mixture of toner powder and carrier particles to an electrostatic image and a process for using the same are disclosed. The apparatus includes developing means for applying the developer mix to the electrostatic image and heat generating means associated with the developing means to directly heat the developer mix whereby the developer mix is electrically stabilized against relative humidity effects, particularly high relative humidity conditions.

23 Claims, 3 Sheets Drawing, 25 Pages Specification

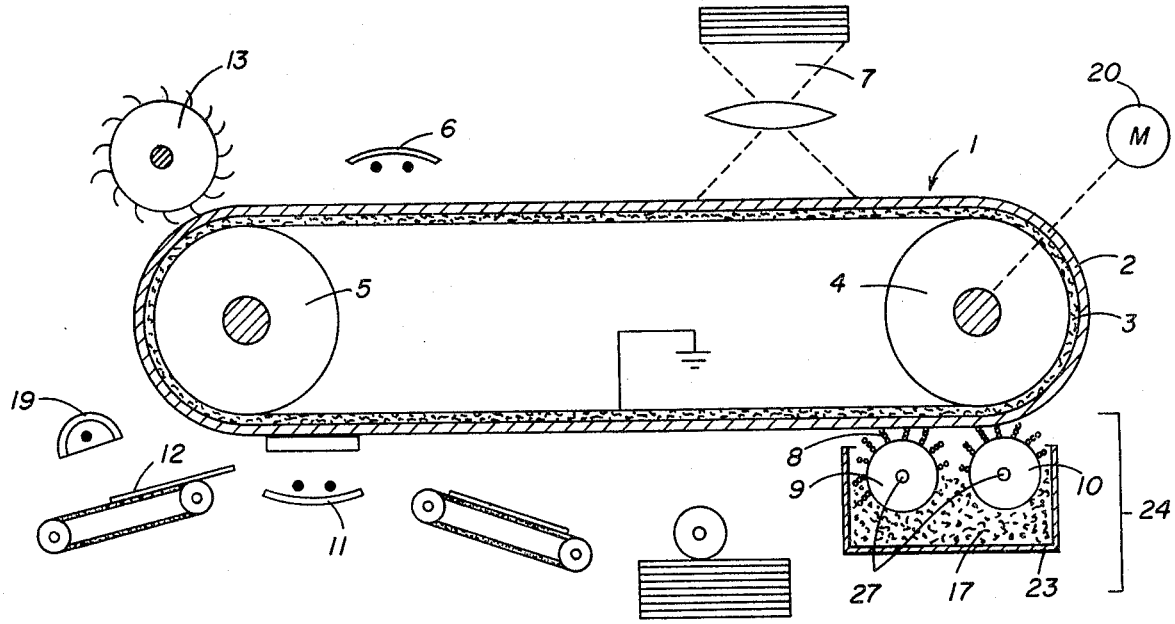

The file of this unexamined application may be inspected and copies thereof may be purchased (849 O.G. 1221, Apr. 9, 1968).